United States Patent [19]

Merrick

[11] 4,408,583
[45] Oct. 11, 1983

[54] IGNITION TIMING CONTROL

[75] Inventor: James W. Merrick, El Paso, Tex.

[73] Assignee: Automatic Controls, Corp., El Paso, Tex.

[21] Appl. No.: 267,011

[22] Filed: May 26, 1981

[51] Int. Cl.³ .............................................. F02P 5/04
[52] U.S. Cl. .................................. 123/415; 123/575; 123/406; 123/146.5 A
[58] Field of Search ......... 123/406, 146.5 A, 146.5 R, 123/415, 575, 609, 610, 618, 650, 651

[56] References Cited

U.S. PATENT DOCUMENTS

| | | | |
|---|---|---|---|
| 3,926,165 | 12/1975 | Merrick | 123/148 E |
| 3,939,811 | 2/1976 | Sasayama | 123/415 |
| 3,943,896 | 3/1976 | Green et al. | 123/415 |
| 3,952,715 | 4/1976 | Van Siclen, Jr. | 123/406 |
| 3,978,833 | 9/1976 | Crall et al. | 123/415 |
| 4,013,050 | 3/1977 | Lace | 123/406 |
| 4,305,350 | 12/1981 | Brown et al. | 123/575 |

FOREIGN PATENT DOCUMENTS

2377533 9/1978 France ................................ 123/609

OTHER PUBLICATIONS

Edison, L. R. and R. C. Richards, "Electrical Circuit Considerations Associated with the Development of an Integrated Electronic Ignition for Passenger Car Applications," Apr. 30, 1973.
Huntzinger, Gerald O. and Gerald E. Rigsby, "HEI—A New Ignition System Through New Technology," SAE 750346, Feb. 24-28, 1975.
Ford Engineering Specification—Module Assay—Ignition (PPI)—Apr. 23, 1975.

Primary Examiner—Parshotam S. Lall
Attorney, Agent, or Firm—Fitch, Even, Tabin & Flannery

[57] ABSTRACT

A programmed timing control controls the occurrence of timing signals relative to engine position in systematic relation to engine speed to provide such spark at a time appropriate for a first fuel at each engine speed. An alternative fuel timing control produces a controlled timing interval systematically related to engine speed and changes the timing of such spark by the controlled timing interval to provide such spark at a time appropriate for a second fuel at each respective engine speed. A variable dwell control provides a dwell control signal for controlling the application of current to the ignition coil. A signal generator coupled to the timing means generates a time varying signal rising in magnitude substantially monotonically and preferrably linerally with time following each interruption of such current until a later time corresponding to the next succeeding interruption of such current. A reference signal generator responds to the magnitude of the time varying signal at each interruption of the current to produce a dwell reference signal of magnitude a predetermined differential less than the magnitude of said time varying signal at such interruption. The differential is preferably constant at moderate engine speeds and varies inversely with speed at high and low speeds. A comparator compares the time varying signal with the dwell reference signal and produces the dwell control signal when the time varying signal substantially reaches the magnitude of the dwell reference signal. The dwell control signal is advanced upon misfire.

6 Claims, 61 Drawing Figures

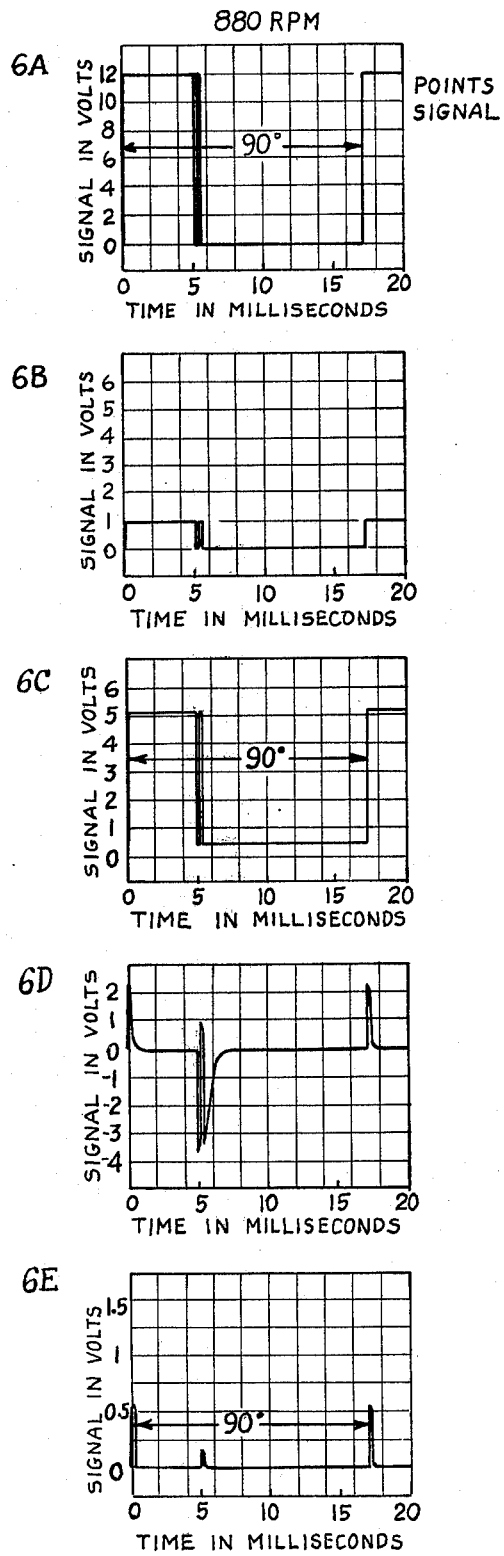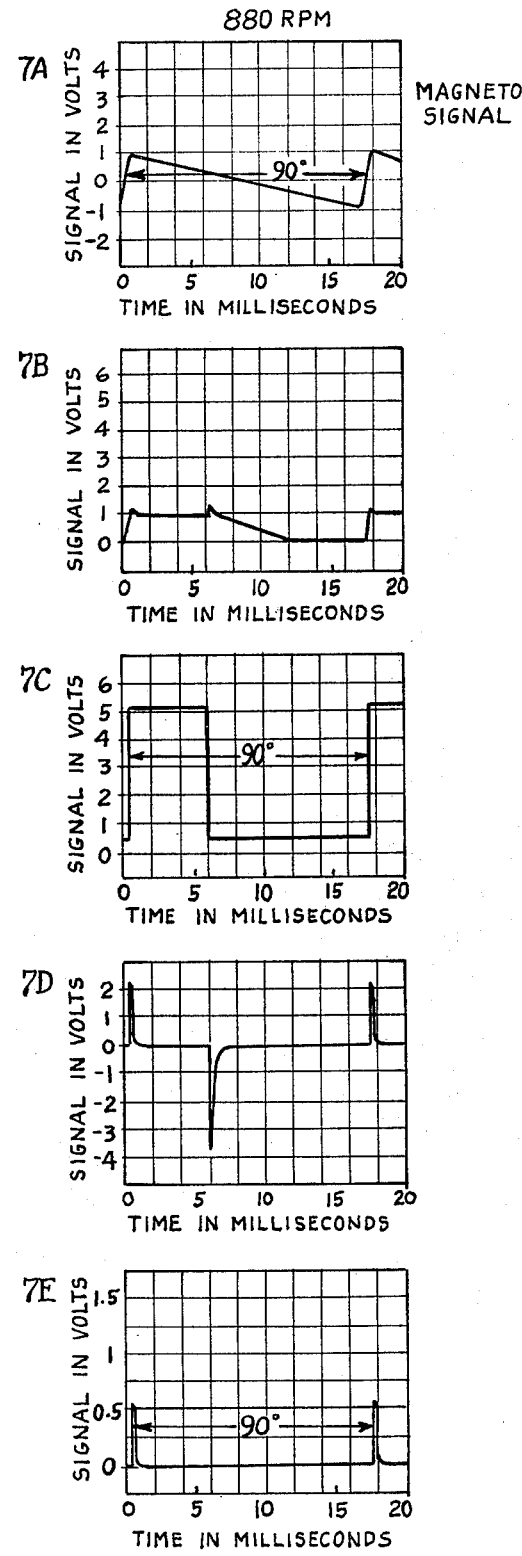

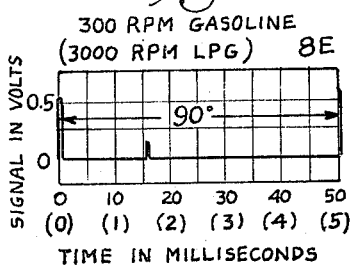
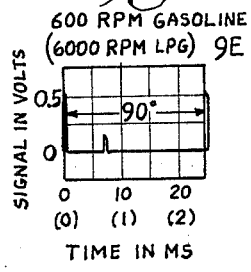
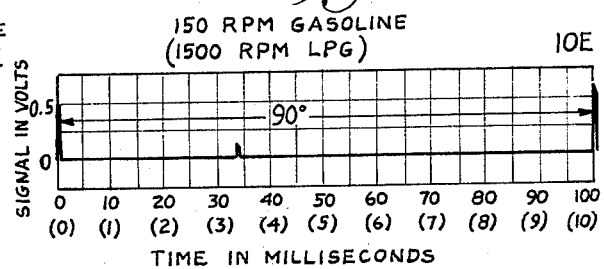
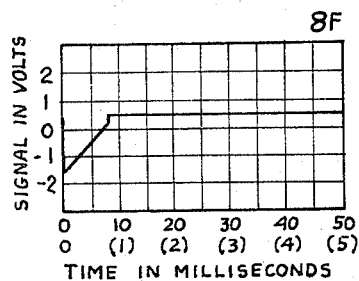
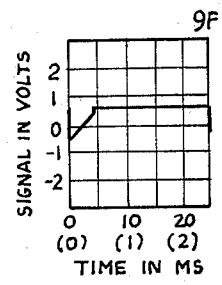
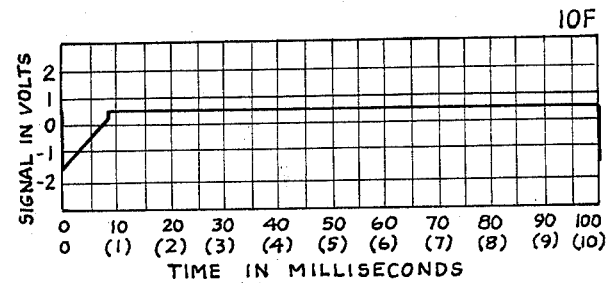
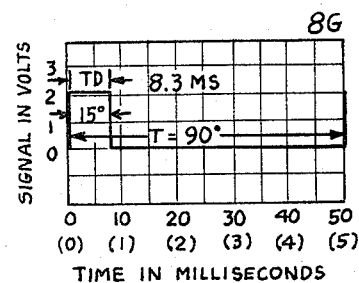
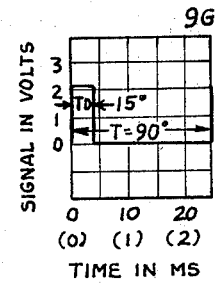
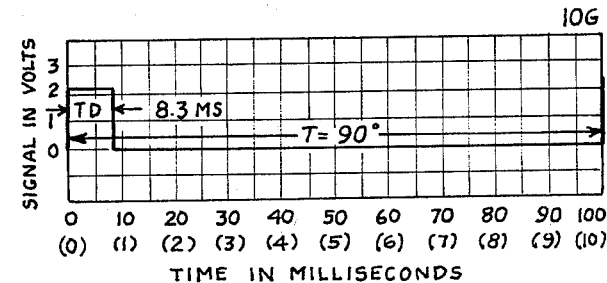
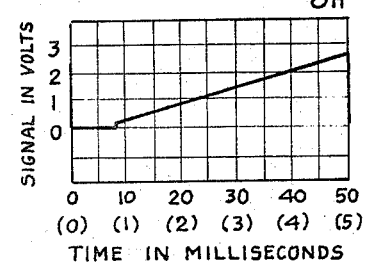
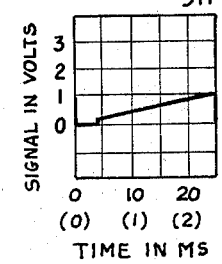
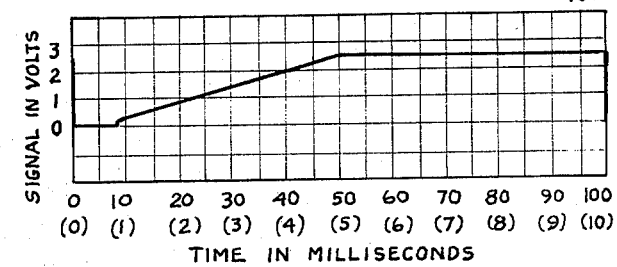
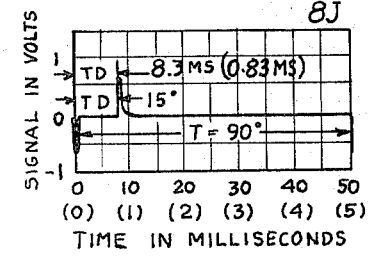
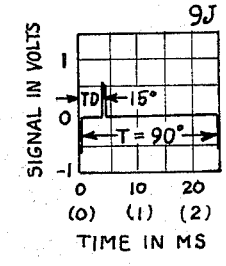
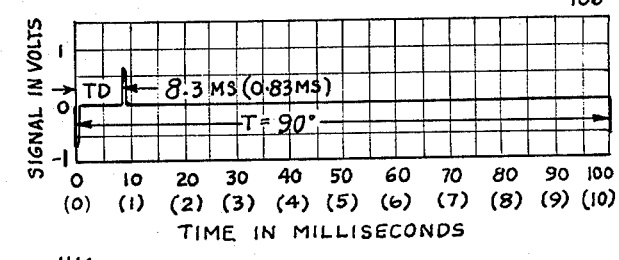
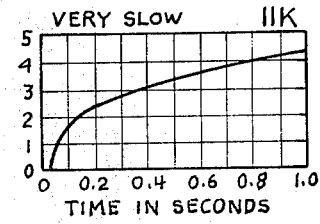

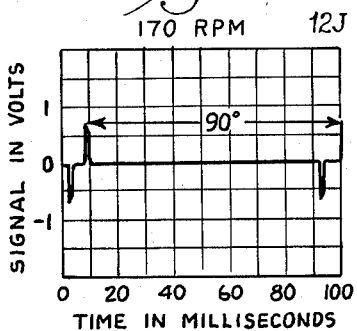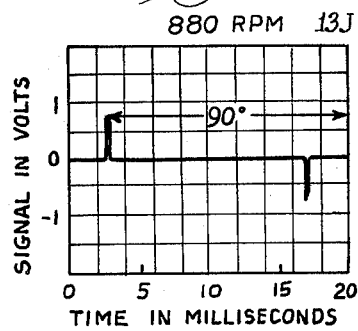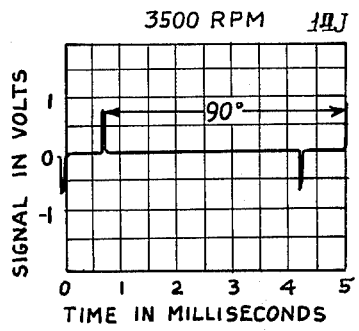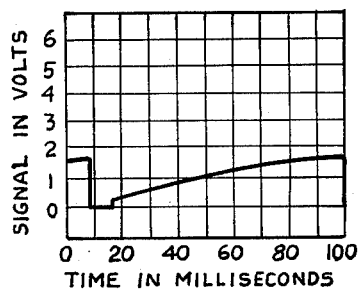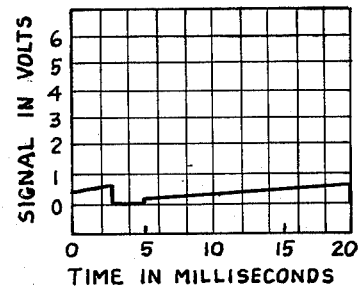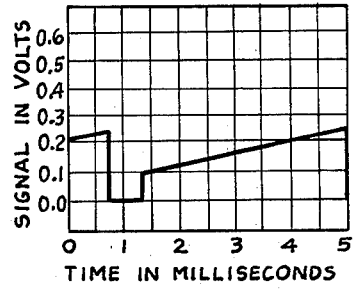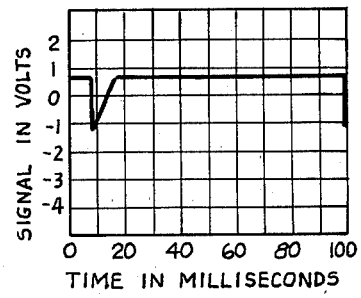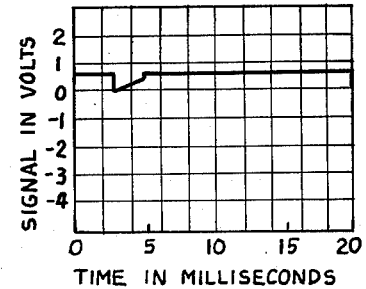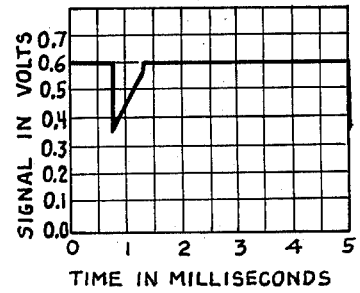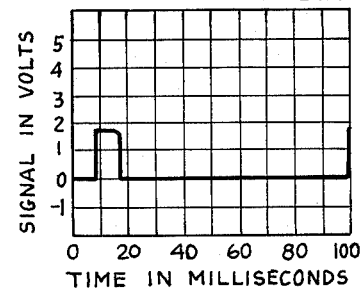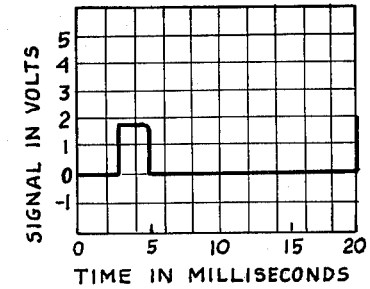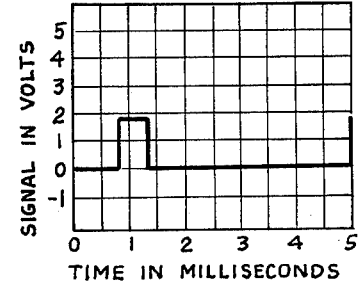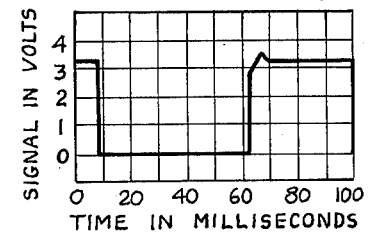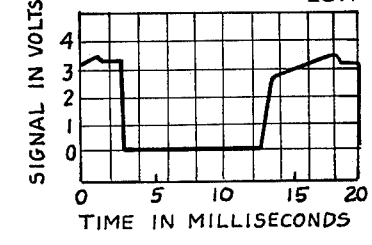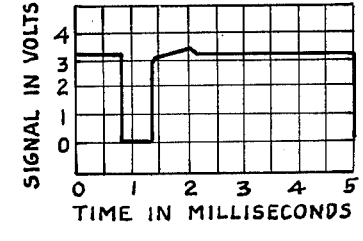

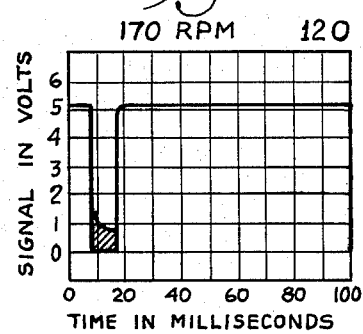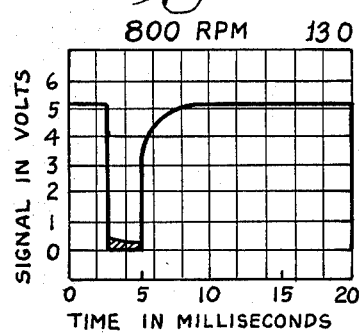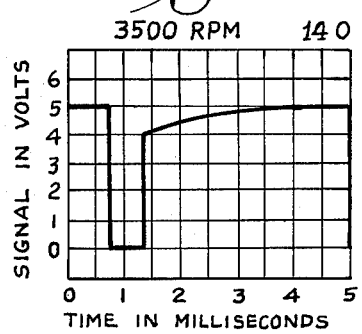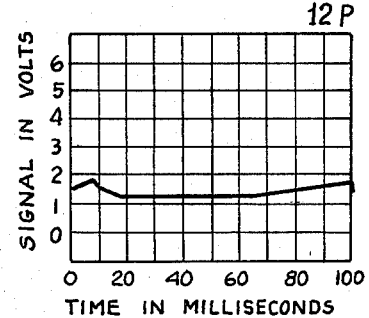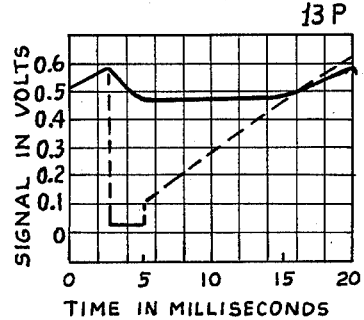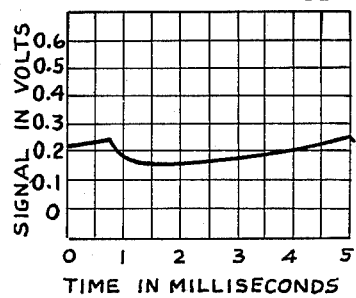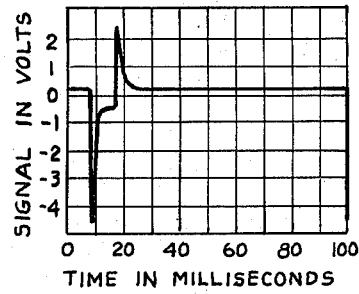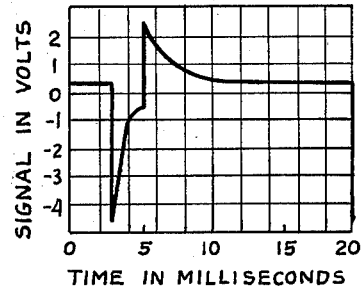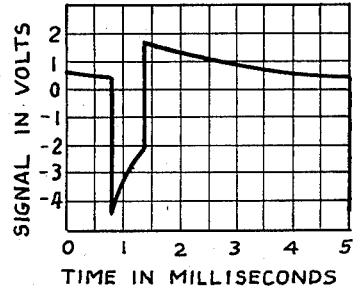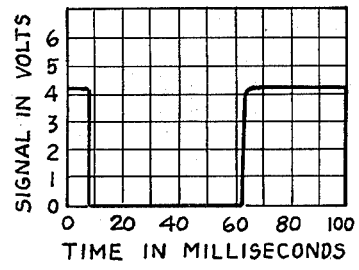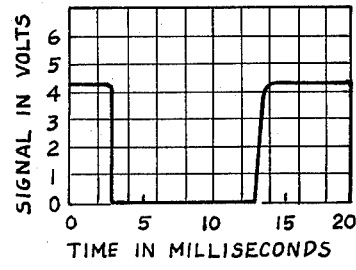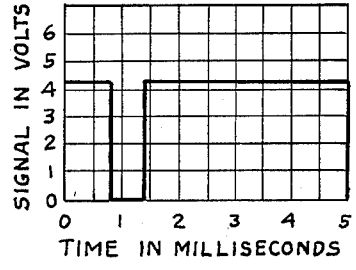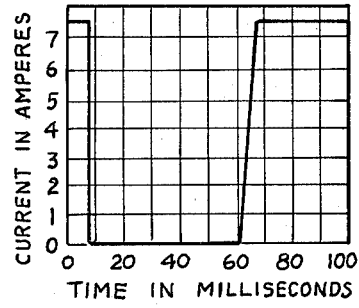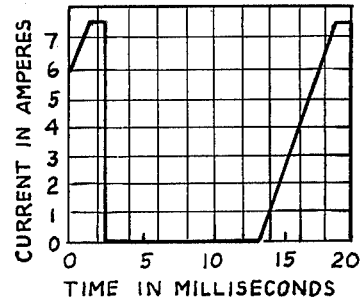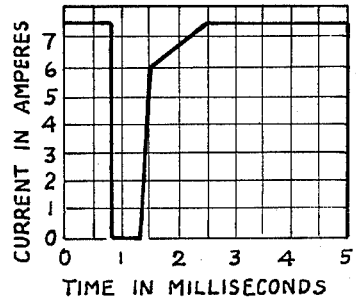

IGNITION TIMING CONTROL

This invention relates generally to automotive ignition systems and more particularly to ignition systems for spark ignited internal combustion engines. Still more particularly it relates to timing controls for providing appropriate ignition timing for multiple fuels. It also relates more particularly to such ignition systems including a variable dwell control.

In spark discharge ignition systems, ignition timing signals indicate when sparks are to be initiated in the spark gaps of respective spark plugs in the respective cylinders of an internal combustion engine to cause combustion to be initiated in the respective cylinders. Conventionally a spark is initiated in a respective cylinder at a particular programmed point in the engine cycle in advance of top dead center of the power stroke for the respective cylinder. In gasoline engines this is typically about 10° in advance of top dead center at idle. However, at higher engine speeds it is desirable that the spark be advanced in a programmed manner as a function of engine speed in order to provide appropriate burning as the stroke reaches top dead center. Inasmuch as the piston reaches top dead center more quickly at higher speeds, it is necessary to advance the time of ignition in each cycle in order that the burning be properly developed at the time of top dead center. This requires the advance of the spark at higher engine speeds, programmed to provide an advance systematically related to engine speed. This is provided by centrifugal means associated with the conventional distributor of the engine, the distributor comprising a rotating switch that supplies the spark energy to the appropriate respective spark plugs. The centrifugal means causes relative displacement between the engine and the rotating switch of the distributor, the relative displacement being a function of engine speed. Typically, a timing of about 30° in advance of top dead center is desirable at high engine speeds in modern gasoline engines. The centrifugal means advances the spark gradually from 10° as the engine speed increases from idle.

With the recent rise in the price and availability of gasoline, alternative fuels are now being utilized. For example, liquified petroleum gas (LPG) and compressed natural gas (CNG) are becoming common for automotive use. These require special fuel tanks and special carburetors; however, such fuels are otherwise adequate for operating conventional gasoline engines. A problem with using such fuels is that the timing of the engine for gasoline operation is not optimum for operation with these alternative fuels. More particularly, with engines of the sort described above having a timing curve suitable for use with gasoline, timing for LPG fuel should typically be about 21° advanced (relative to top dead center) at idle and 35° advanced at high speed (3000 RPM). With CNG fuel the timing curve might reasonably go from 25° at idle to 44° advanced at high speed (3000 RPM).

It has been common to modify gasoline engines for operating with LPG or CNG fuel. As suggested above, this has involved the replacement of the gasoline carburetor with a carburetor appropriate for burning the alternative fuels. At times the one has merely been piggybacked upon the other. An effort has been made to accommodate the difference in timing by mechanical adjustment of the distributor, i.e., by adjusting the advance by a fixed amount. The trouble with this has been that, for example, there is a substantial difference between the optimum timing advance for gasoline and that for LPG at idle, whereas at high speed the optimum timing advance is about the same for both fuels. This means that if the conventional distributor is adjusted mechanically for proper advance at idle for LPG fuel, the programmed centrifugal timing control associated with the distributor will cause the timing advance to be too great for LPG fuel at high speed. On the other hand, if a compromise is used and the advance adjusted to be proper at intermediate speeds, then the timing advance for LPG fuel is inappropriate at both idle and high speed.

In accordance with one aspect of the present invention a controlled timing interval is added to the conventional timing advance to provide a programmed timing advance that is appropriate for a particular fuel at all engine speeds. In accordance with the preferred embodiment of the present invention a controlled timing interval is developed that varies linearly from one value at idle to another value at high speeds. By the simple closure of a switch by the operator, this controlled timing interval is added to the conventional timing advance interval present in the typical ignition system for gasoline engines so that the timing becomes appropriate for the alternative fuel. More particularly, in accordance with the preferred embodiment of the invention, the distributor is adjusted mechanically to advance the spark a fixed amount and then the timing control circuit operates to retard the spark from that advance. When gasoline is used as a fuel, the gasoline is retarded by just the amount of mechanical advance put in. However, when the alternative fuel is used, the programmed controlled timing interval reduces the amount of advance less at low speed than at high speeds, leaving the spark advanced at lower speeds relative to the normal timing for gasoline ignition.

In accordance with another aspect of the present invention a variable dwell control controls the timing of the application of current to the ignition coil prior to the initiation of a spark by interruption of such current. A signal generator responds to the output of the programmed timing advance circuit to generate a time varying signal rising in magnitude substantially monotonically and preferably linearly with time following each interruption of the current in the primary of the ignition coil until a later time corresponding to the next succeeding interruption. A reference signal generator responds to the magnitude of the time varying signal at each interruption of the current to produce a dwell reference signal. In a preferred embodiment of the invention, a peak signal is developed that corresponds to the magnitude of the time varying signal at the time of current interruption. The dwell reference signal is a voltage differential less than the peak voltage, such differential being preferably substantially constant at moderate operating engine speeds and otherwise inversely related to engine speed. The time varying signal is compared to the dwell reference signal. When the time varying signal next substantially reaches the magnitude of the dwell reference signal, the current through the ignition coil is reinstituted. Thus, one of the principal aspects of the present invention is to provide a method and apparatus for adjusting the timing of an engine set for operation with one fuel, to produce ignition sparks at times appropriate for an alternative fuel at all engine speeds. Another principal aspect of the present invention is to provide a variable dwell control for applying curent to the ignition coil at an appropriate time before current interruption.

These and other aspects of the present invention will become apparent from consideration of the following detailed description, particularly when taken in conjunction with the accompanying drawings, in which:

FIGS. 6A–6E are an illustration of waveforms of signals at respective points A–E of the circuit shown in FIG. 5 for timing signals developed from breaker points at an engine speed of 880 rpm;

FIGS. 7A–7E are an illustration of waveforms of signals at respective points A–E of the circuit shown in FIG. 5 for timing signals developed from a magneto at an engine speed of 880 rpm;

FIGS. 8E–8J are an illustration of waveforms of signals at respective points E–J of the circuit shown in FIG. 5 at an engine speed of 300 rpm in the gasoline mode and at 3000 rpm in the LPG mode;

FIGS. 9E–9J are an illustration of waveforms of signals at respective points E–J of the circuit shown in FIG. 5 at an engine speed of 600 rpm in the gasoline mode and at 6000 rpm in the LPG mode;

FIGS. 10E–10J are an illustration of waveforms of signals at respective points E–J of the circuit shown in FIG. 5 at an engine speed of 150 rpm in the gasoline mode and at 1500 rpm in the LPG mode;

FIG. 11 is an illustration of the waveform of the signal at the point K of the circuit shown in FIG. 5 at a very low engine speed;

Figure 5:
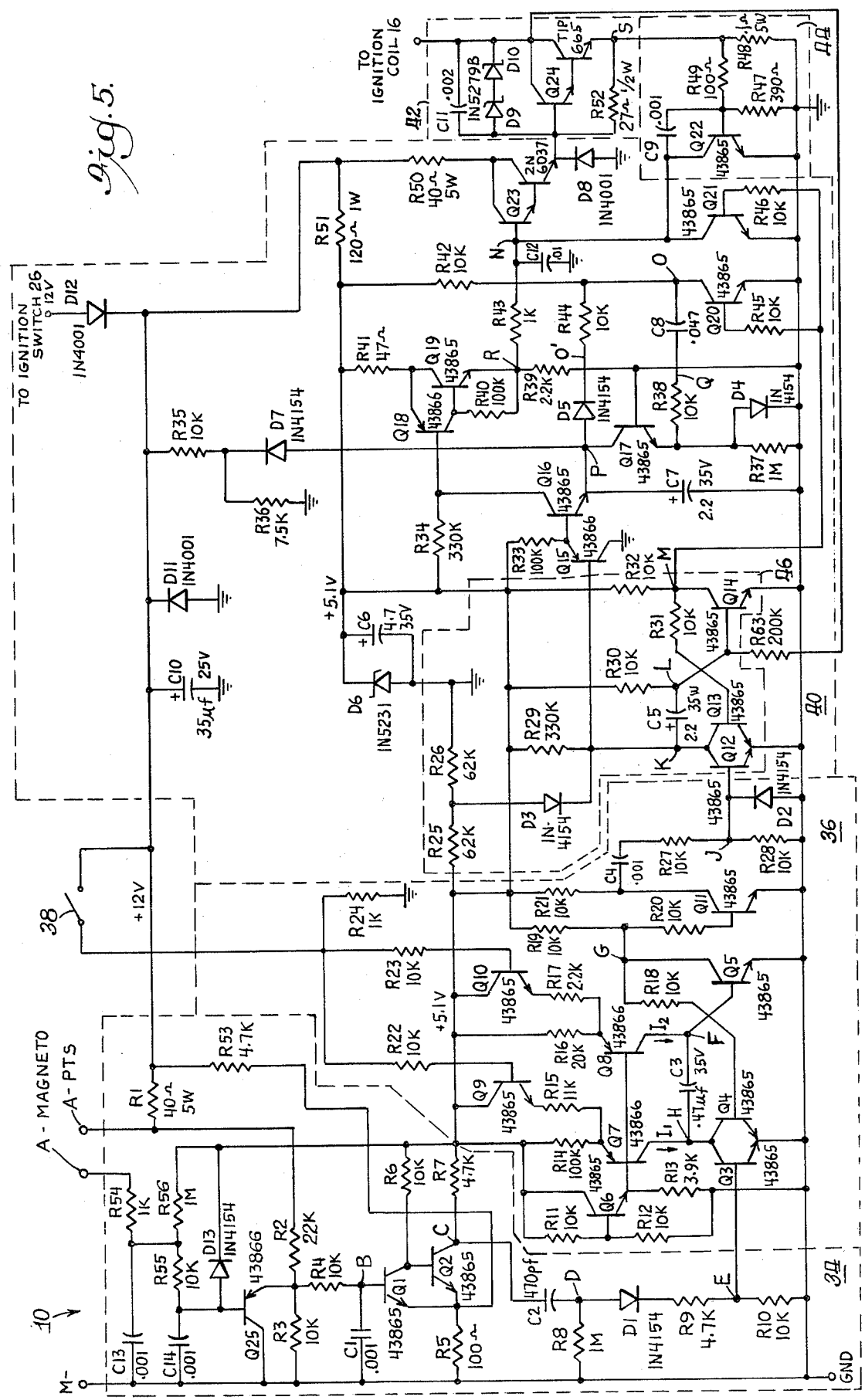
FIG. 5 is a circuit diagram of a preferred embodiment of the ignition system shown in FIG. 2 incorporating a timing retard circuit and a variable dwell circuit in accordance with the present invention.

FIGS. 12-I(J–N) and 12-II(O–S) are illustration of the waveforms of the signals at respective points J–S of the circuit shown in FIG. 5 at an engine speed of 170 rpm;

FIGS. 13-I(J–N) and 13-II(O–S) are an illustration of the waveforms of the signals at respective points J–S of the circuit shown in FIG. 5 at an engine speed of 880 rpm; and FIGS. 14-I(J–N) and 14-II(O–S) are an illustration of the waveforms of the signals at respective points J–S of the circuit shown in FIG. 5 at an engine speed of 3500 rpm.

Figure 1:
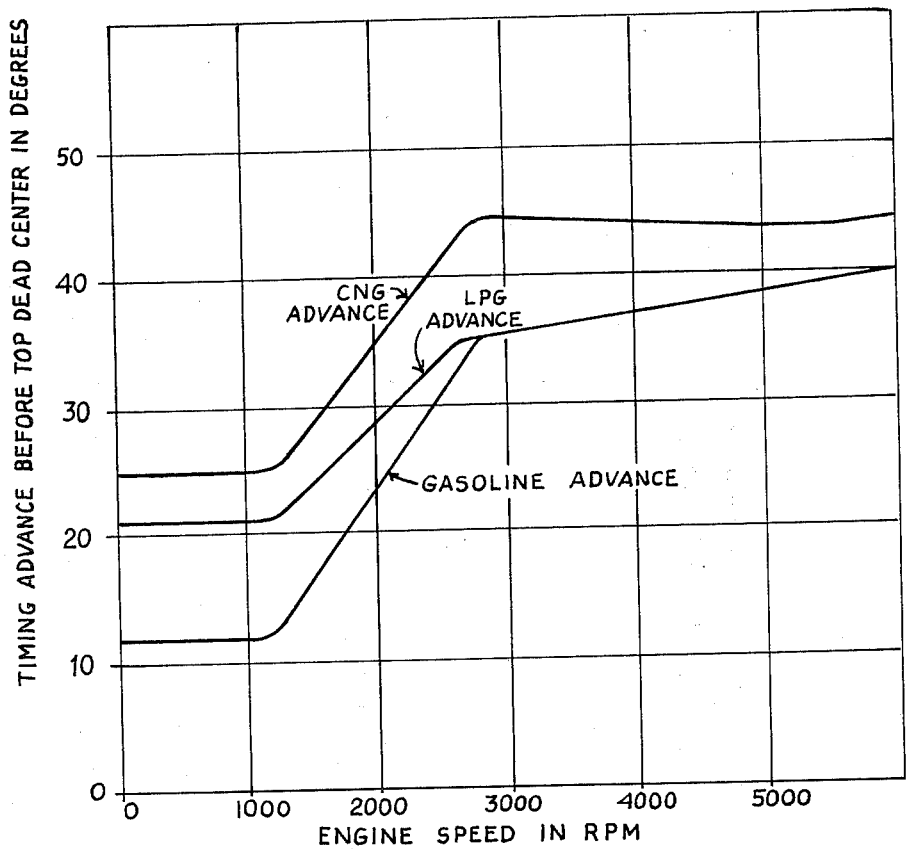
FIG. 1 is a graph showing the timing advance desired for different fuels.

FIG. 1 illustrates typical desired programmed timing advances before top dead center as functions of engine speeds for typical engines using different fuels, specifically gasoline, LPG and CNG. Conventional gasoline engine ignition systems are set up for the distributor to provide the programmed timing advance as shown by the GASOLINE ADVANCE curve for gasoline. In accordance with the present invention, a programmed incremental advance is added to the normal GASOLINE ADVANCE to provide programmed timing advance for the alternative fuels, as shown by the curves LPG ADVANCE and CNG ADVANCE. An ignition system in accordance with the present invention for providing such programmed timing advance for alternative fuels is illustrated generally in FIG. 2.

Figure 2:
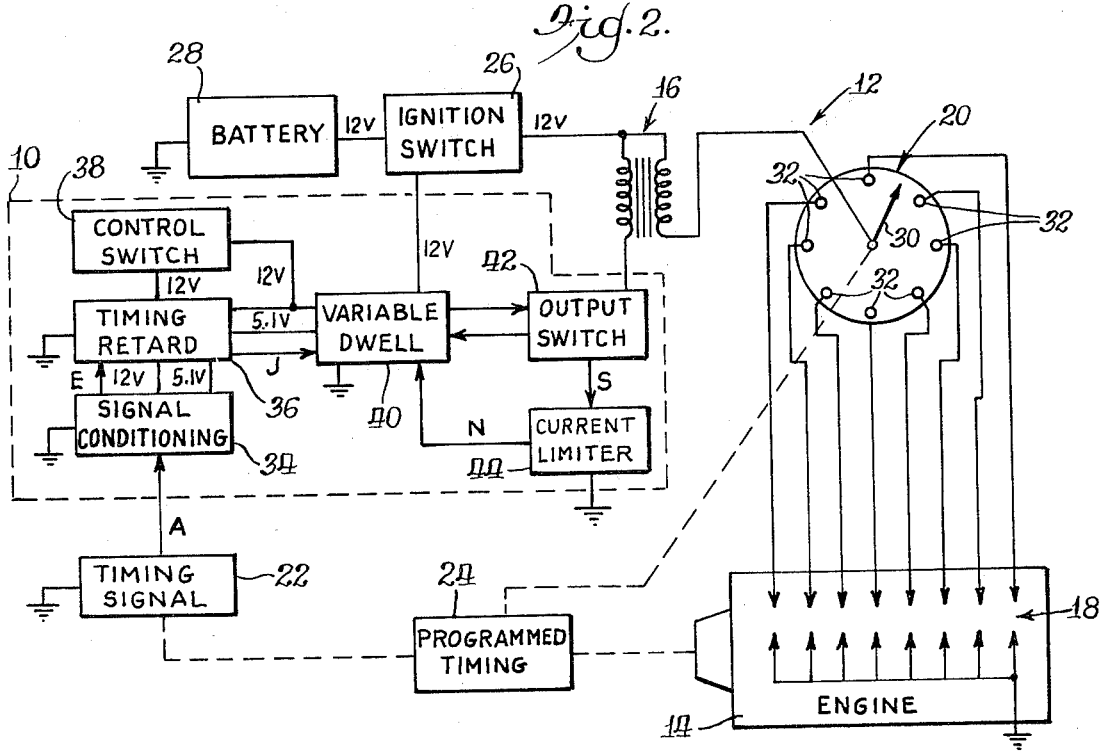
FIG. 2 is a diagrammatic illustration of an engine ignition system utilizing the timing advance and the variable dwell control of the present invention.

As shown generally in FIG. 2, the present invention comprises an ignition timing control 10 as used in an ignition system 12 for a spark ignited internal combustion engine 14. The ignition system 12 includes conventional elements, including an ignition coil 16, spark plugs 18, a distributor 20 and a timing signal generator 22. Associated with the distributor 20 and the timing signal generator 22 is a programmed timing control 24. An ignition switch 26 couples a battery 28 to the ignition system 12.

In a conventional ignition system the timing signal generator 22 may comprise a cam operated breaker point device driven from the engine 14 through the programmed timing control 24 for timed opening of a switch in synchronism with engine rotation. That is, the breaker points separate at particular positions of the engine cycle. The breaker points are connected between the primary of the ignition coil 16 and ground in conventional ignition systems, so that each time the breaker points separate, current through the primary of the ignition coil is interrupted, causing a high voltage to be developed in the secondary of the ignition coil. The secondary is electrically connected to the rotor 30 of the distributor 20. The rotor 30 is mechanically driven by the engine 14 through the programmed timing control 24. This drives the rotor 30 at a speed corresponding to engine speed, and hence in synchronism with the timing signals from the timing signal generator 22. The rotation of the rotor 30 connects the secondary of the ignition coil 16 to successive distributor contacts 32, which are in turn connected to respective terminals of respective spark plugs 18. The other terminals of the spark plugs 18 are grounded.

In the operation of the conventional ignition system, the timing signal generator 22 breaks the circuit of the primary winding of the ignition coil 16 at particular times in the engine cycle, hence causing high voltage to appear at the secondary of the ignition coil 16. These high voltage pulses are applied by the rotor 30 through respective successive contacts 32 of the distributor 20 to the respective spark plugs 18, generating sparks at the respective times as determined by the timing signal generator 22. The breaker points are thereafter closed for a dwell time during which the current in the primary of the ignition coil 16 is reestablished for supplying energy for a subsequent spark.

The programmed timing control 24 conventionally comprises a centrifugal control formed of centrifugal weights and springs that operate to vary the position of the rotor 30 relative to the position of the engine 14 as a function of engine speed. More particularly, as it is desirable and conventional that the spark be advanced at higher engine speeds because of the shorter time between ignition and top dead center at high engine speeds, the programmed timing control operates to advance the timing signal generator 22 relative to engine position as speed increases, in order that the spark be advanced as a function of engine speed.

The ignition system 12 as thus far described in connection with FIG. 2 comprises a conventional ignition system as used to provide the typical timing advance as a function of engine speed for engines burning gasoline. That is, the system as thus far described produces the programmed timing curve GASOLINE ADVANCE as shown for gasoline in FIG. 1. To provide a programmed timing advance for alternative fuels the ignition timing control circuit 10 is interposed between the timing signal generator 22 and the primary of the ignition coil 16.

As shown in FIG. 2, the ignition timing control circuit 10 includes a signal conditioning circuit 34 which receives the timing signals from the timing signal generator 22 and acts in response to such timing signals to produce relatively sharp electronic pulses corresponding to respective signals from the timing signal generator 22. That is, each time the breaker points are separated, a corresponding pulse is produced by the signal conditioning circuit 34. Alternatively, if the timing signal generator includes a magneto, a corresponding pulse is produced by the signal conditioning circuit 34 at a particular point in the cycle of the magneto.

The pulses from the signal conditioning circuit 34 are applied to a timing retard circuit 36 which operates to produce corresponding delayed pulses, delayed according to one programmed incremental retard when gasoline is the fuel, and in accordance with another incremental timing retard when another fuel is used. The difference in the two amounts of retard is the programmed difference in the two programmed timing advances for the respective fuels. It is only possible to delay pulses, not advance them, relative to the pulses from the signal conditioning circuit 34. Therefore, to obtain an effective advance, which is what is desired, a mechanical offset advance is applied by mechanically adjusting the programmed timing control 24, and the programmed advance is effected by subtracting from such advance. The mechanical offset is easy enough to achieve with standard timing controls, as one of the adjustments therein is a mechanical adjustment to adjust the basic timing advance. For example, the programmed timing control 34 may be manually offset by 15° to provide an additional 15° of advance; then the timing retard circuit 36 may retard the pulses from the advanced pulses produced in the timing signal generator 22. In the case of the gasoline timing advance, the timing retard circuit 36 provides delayed pulses which return the programmed timing advance to that of the original typical gasoline timing advance curve. For the case where 15° advance has been introduced, the timing retard circuit provides 15° delay for gasoline timing. The timing retard for the alternative fuel is then less, and hence providing an effective additional advance relative to the gasoline timing advance curve. Which timing advance is utilized is determined by operation of a control switch 38.

The output of the timing retard circuit 36 is applied to a variable dwell circuit 40. The variable dwell circuit 40 provides a signal for turning on the current through the primary of the induction coil 16 at an appropriate time in advance of its being interrupted in order that appropriate energy may be introduced into the ignition coil so that subsequent interruption of the current produces the desired spark. The variable dwell circuit 40 provides signals for both turning on and turning off the current through the primary of the ignition coil 16 in response to the signals from the timing retard circuit 36. The signals from the variable dwell circuit 40 are applied to an output switch 42 connected to effect such switching of the current. The output switch 42 switches the current through a current limiter circuit 44, which operates to limit the current through the primary of the ignition coil 16 to an appropriate level.

Figures 3, 4:
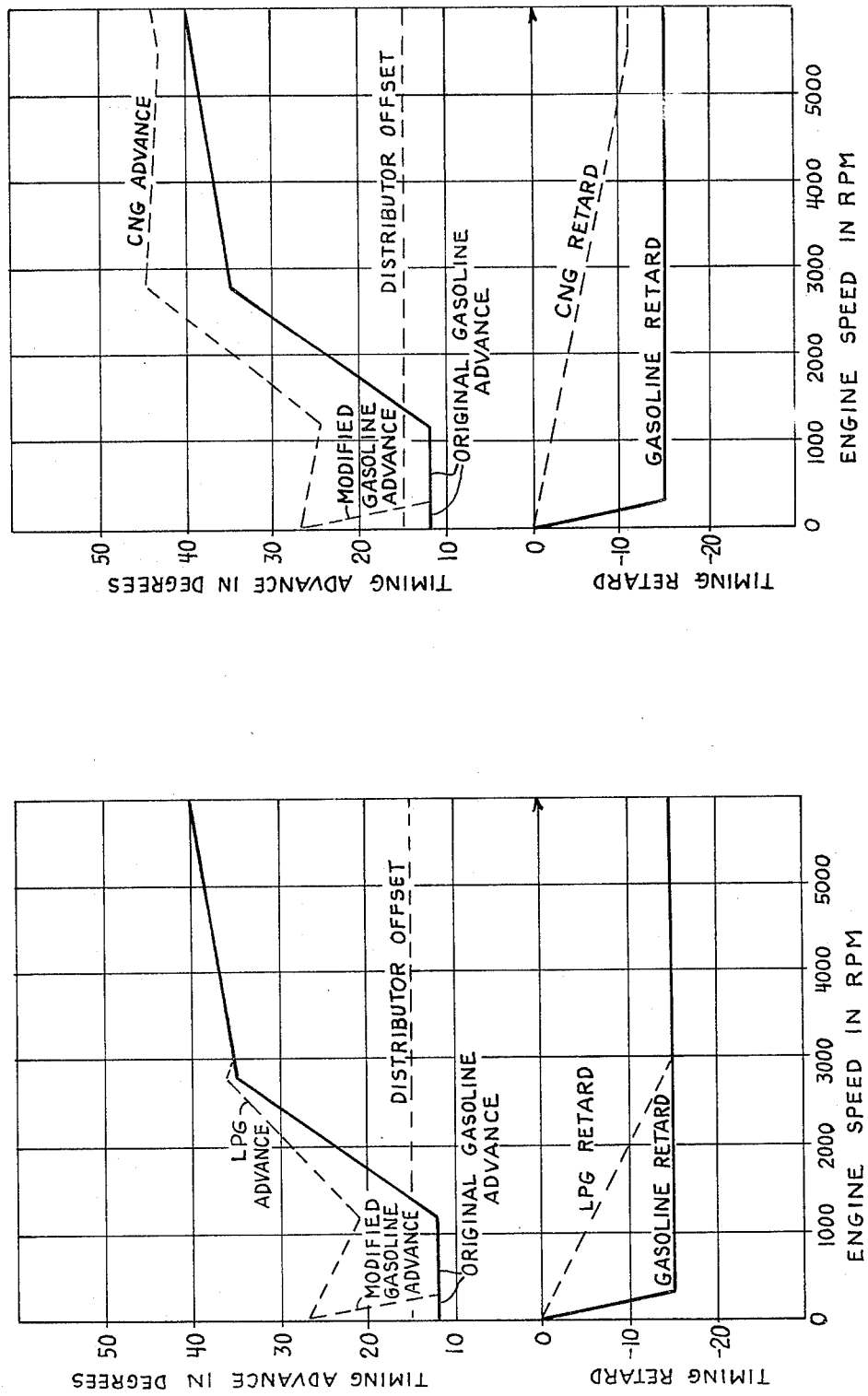
FIG. 3 is a graph illustrating development of a programmed timing advance for LPG in in accordance with the present invention.
FIG. 4 is a graph illustrating the development of a programmed timing advance for CNG in accordance with the present invention.

Reference to FIG. 3 will provide a general understanding of the operation of the ignition system 12 shown in FIG. 2. As shown in FIG. 3, the timing retard circuit 36 provides one of two programmed ignition retard intervals, GASOLINE RETARD and LPG RETARD. These are selectable by operation of the control switch 38. Each of these programmed retard intervals provides a particular programmed retard as a function of engine speed. The line identified as DISTRIBUTOR OFFSET signifies the offset provided by mechanical adjustment of the programmed timing control 24. The programmed timing retard increment provided by the timing retard circuit 36 and the mechanical adjustment combine with the advance as originally provided with the engine by the programmed timing control 24 to produce the respective programmed timing advance as shown in FIG. 3 by the curves modified GASOLINE ADVANCE and LPG ADVANCE.

More specifically, the programmed GASOLINE ADVANCE curve as shown in FIG. 1, and as provided by the programmed timing control 24 as it comes with the engine, is combined with the DISTRIBUTOR OFFSET and a respective one of the programmed retard intervals to provide a timing advance appropriate for a particular fuel. For example, the programmed MODIFIED GASOLINE ADVANCE curve as shown in FIG. 3 is provided by adding the GASOLINE ADVANCE curve shown in FIG. 1 (and reproduced as the ORIGINAL GASOLINE ADVANCE curve in FIG. 3) to the DISTRIBUTOR OFFSET shown in FIG. 3, and then the GASOLINE RETARD increment is subtracted therefrom, resulting in the MODIFIED GASOLINE ADVANCE curve shown in FIG. 3, which differs from the GASOLINE ADVANCE curves shown in FIG. 1 only at very low rpm. Similarly the LPG ADVANCE curve is produced by combining the ORIGINAL GASOLINE ADVANCE, the DISTRIBUTOR OFFSET and the LPG RETARD curves.

Comparison of the LPG ADVANCE curve shown in FIG. 3 with the LPG ADVANCE curve shown in FIG. 1 demonstrates that the timing retard circuit 36 provides a suitable advance from the GASOLINE ADVANCE curve as to approximate the desired LPG ADVANCE curve. It may be noted that the timing advanced curves produced by the timing retard circuit 36 differ somewhat from the desired programmed advance curves below 1000 rpm. As 1000 rpm is approximately idle for conventional engines, this makes relatively little difference, particularly as each of the curves is relatively flat below 1000 rpm anyway. There is a sharp break in the gasoline advance curve at about 300 rpm but this is so far below idle as to be of no particular consequence. All that is necessary below idle is that the timing be sufficient to permit the engine to start. Once started, it operates at idle. No power is demanded of the engine under those circumstances except, of course, the power necessary to turn the engine over.

FIG. 4 illustrates the similar generation of the CNG ADVANCE curve, which is obtained by adding the ORIGINAL GASOLINE ADVANCE, the DISTRIBUTOR OFFSET and the CNG RETARD curves. The CNG RETARD curve is generated in the same fashion as the LPG RETARD curve, using different components, as discussed further below.

For an understanding of how the ignition timing control circuit 10 operates to develop the programmed timing advance curves shown in FIGS. 3 and 4, reference is made to the detailed circuit of the ignition timing control circuit 10 as shown in FIG. 5, and to the waveforms developed at respective points in the circuit. A preferred embodiment of the circuit comprises the components as identified and connected as shown in FIG. 5.

As shown in FIG. 5, the timing signal from the timing signal circuit 22 is applied to the signal conditioning circuit 34 at a terminal A-PTS if the signal is produced by breaker points and at a terminal A-MAGNETO if the signal is produced by a magneto. Waveforms for various points in the signal conditioning circuit 34 are shown in FIG. 6 when the input is from breaker points and in FIG. 7 when the input is from a magneto. The waveforms in both figures are for an engine speed of 880 rpm. If a breaker point signal is applied, the signal will be in the form shown by waveform 6A. If a magneto signal is applied, the signal will be in the form shown by waveform 7A. As the signal at the input terminal A-PTS is created by the opening and closing of the breaker points, the signal is at ground until the points open, at which time the terminal A-PTS is driven to +12 v through a resistor R1 from a +12 v bus. The +12 v bus receives its potential from the ignition switch 26 through a diode D12. The +12 v is developed across a smoothing capacitor C10 and a diode D11. The signal at the terminal A-PTS is applied to a voltage divider formed by resistors R2 and R3, and that portion of the signal developed across the resister R3 is applied through a resistor R4 to a point B to produce a signal as shown by wave-form 6B. A capacitor C1 is connected between the point B and ground.

Should the timing signal generator 22 take the form of a magneto, the magneto signal may be applied at the terminal A-MAGNETO through a network comprised of resistors R54, R55 and R56, capacitors C13 and C14, a diode D13 and a transistor Q25 to develop a corresponding signal at the point B, as shown by waveform 7B.

The signal at the point B is applied through a transistor Q1 to a transistor Q2, both of which are biased by a voltage developed across a resistor R5 through a resistor R53 from the +12 v bus. Power for the transistors Q1 and Q2 is applied through resistors R6 and R7, respectively, from a +5.1 v bus. The +5.1 v is developed across a zener diode D6 through a resistor R51 from the +12 v bus. A capacitor C6 is connected across the diode D6. When the signal applied at the point B goes positive, it turns on the transistor Q1, which in turn turns off the transistor Q2. Hence, opening of the points at the point A-PTS causes the output of the transistor Q2 at a point C to go positive as shown by waveform 6C. Alternatively, with magneto input, the signal at the point C takes the form illustrated by waveform 7C.

The signal from the point C is applied through a capacitor C2 to a point D which is connected to ground through a resistor R8. The capacitor C2 thus passes only the AC component of the signal at the point B to produce the signal shown by waveform 6D for a breaker points input and by waveform 7D for a magneto input.

This signal is applied through a diode D1 across a voltage divider comprised of resistors R9 and R10. The diode D1 serves to cut off the negative portion of the signal developed at the point D to produce a signal at a point E as shown by waveform 6E for a breaker points input and by waveform 7E for a magneto input. This is the signal output from the signal conditioning circuit 34 and is applied to the timing retard circuit 36. With an 8 cylinder engine, as shown in this example, and operating at substantially constant speed, the output pulses at the point E will be 90° apart in respect to engine rotation.

It may be noted in waveform 6A that a parasitic pulse occurs following the closing of the breaker points. This is occasioned by contact bounce on closure. The pulse is carried forward to succeeding points B, C, D and E; see waveforms 6B, 6C, 6D and 6E. However, by the time it reaches point E, it has been much attenuated, mostly in passing the capacitor C2 and the diode D1, so that at the point E it is of small magnitude compared to the pulse occasioned by opening of the breaker points. Indeed, it is made so small as not to be able to trigger the timing retard circuit 36. There is no such parasitic pulse when there is a magneto input.

The timing retard circuit 36 as shown in FIG. 5 includes a one shot multivibrator comprised of transistors Q3, Q4 and Q5 and a capacitor C3. Power is supplied from the +5.1 v bus to the transistors Q3 and Q4 through a resistor R14 and a transistor Q7. The collectors of transistors Q3 and Q4 are connected to one side of the capacitor C3, the other side of which is connected to the base of the transistor Q5. Power is supplied to the transistor Q5 from the +5.1 v bus through a resistor R19. The collector of the transistor Q5 is connected to the base of the transistor Q4 through a resistor R18. The other side of the capacitor C3 is connected to the +5.1 v bus through a resistor R16 and a transistor Q8.

Resistors R11, R12 and R13 and a transistor Q6 constitute a source of stable bias potential for the transistors Q7 and Q8. That is, the resistors R11 and a R12 are connected in series between the +5.1 v bus and ground, developing a predetermined fixed potential at their junction. This potential is applied to the base of the transistor Q6, thereby causing the voltage across the resistor R13 to be substantially equal to that across the resistor R12. With resistors R11 and R12 of equal resistance, this voltage will be about 2.5 v. The consequence of such biasing of the transistors Q7 and Q8 is that when these transistors conduct at all, they conduct respective constant currents $I_1$ and $I_2$ as determined by their respective resistors R14 and R16. When they conduct, they conduct such current as to cause the voltage drops across the respective resistors R14 and R16 as would put the potentials at their emitters slightly above the bias potential of 2.5 v. With the components shown, $I_1$ is about 25 microamperes, and $I_2$ is about 125 microamperes.

Assuming the multivibrator to be in its quiescent state when a pulse at the point E is applied to the base of the transistor Q3, the transistor Q3 conducts, discharging the capacitor C3 and driving the base of the transistor Q5 low. This turns off the transistor Q5, hence raising the potential of the base of the transistor Q4, keeping that transistor on even after the pulse that initially turned on the transistor Q3 has dissipated. With the one side of the capacitor C3 thus grounded, the capacitor C3 is charged by the constant current $I_2$ through the transistor Q8 until the potential at a point F, the base of the transistor Q5, reaches a potential sufficiently above ground as to enable the transistor Q5 to turn on. This terminates the period of the multivibrator as it lowers the potential of a point G, the collector of the transistor Q5, to ground potential, hence acting through the resistor R18 to turn off the transistor Q4. Constant current $I_1$ then flows through the resistor R14 and the transistor Q7 at a constant rate to charge the capacitor C3 oppositely, raising the potential at a point H, the collectors of the transistors Q3 and Q4.

The capacitor C3 would charge fully to the voltage permitted by the bias potential on the base of the transistor Q7 were a subsequent pulse not to arrive meanwhile at the point E. As the voltage to which point H rises is the amount by which the voltage at the point F is reduced upon conduction by the transistors Q3 and Q4, the higher the voltage rises at the point H, the longer it takes for current through the resistor R16 and the transistor Q8 to raise the potential at the point F to permit conduction by the transistor Q5. The consequence of this is that the longer the time between pulses at the point E, the higher the potential that is reached at the point H, up to the time when the pulses are so far apart that the potential reaches the bias potential on the base of the transistor Q7, about +2.4 v, and hence the longer the time it takes for the potential at the point F to rise to permit conduction by the transistor Q5. By appropriately sizing the components so that the point H does not reach +2.4 v within the applicable range of speeds, the period of the multivibrator can be made a function of the time between pulses and hence a constant delay, e.g., 15°, in terms of angle of rotation at all speeds above the mentioned threshold. Below that threshold the period of the multivibrator remains constant in terms of time, e.g., 8.3 milliseconds.

The signal at the point G is applied through a resistor R20 to a transistor Q11 which operates as a buffer amplifier. The transistor Q11 is connected to the +5.1 v bus through a load resistor R21. The output of the transistor Q11 is applied through a capacitor C4 and a resistor R27 to a point J. A resistor R28 is connected between the point J and ground, as is a diode D2. The diode D2 limits negative signals passed through the capacitor C4. The positive excursions of the signals are limited by the input circuit of the succeeding varible dwell circuit 40.

FIGS. 8, 9, and 10 illustrate the waveforms appearing under certain conditions at the points E to J in the circuit of FIG. 5, that is, the points from the input point E to the output point J of the timing retard circuit 36. Shown in FIGS. 8 and 9 are the waveforms at the respective points when the engine is operating at speeds wherein the circuit provides a time delay that is a constant fraction of the engine cycle.

In FIG. 8 are shown the waveforms 8E to 8J at the respective points E to J for the timing retarded circuit 36 illustrated in FIG. 5 with the engine operating at 300 rpm in the gasoline mode. In FIG. 9 are shown corresponding waveforms for the same timing retard circuit 36 with the engine operating at 600 rpm in the gasoline mode. The operation of the circuit may be understood from consideration of these waveforms 8E to 8J and 9E to 9J. A pulse at the point E (waveforms 8E and 9E) drives the transistor Q3 to conduction, hence grounding point H and dropping the voltage at the points F (waveforms 8F and 9F) and H (waveforms 8H and 9H) by the +2.4 v potential that had previously existed at the point H. The lowering of the potential at the point F cuts off the transistor Q5, hence raising the potential at point G from ground to 2 v, as shown by waveforms 8G and 9G. This potential at the point G is applied through the resistor R18 to the base of the transistor Q4 to turn it on and hold it on after the pulse applied at the point E to turn on the transistor Q3 has dissipated.

The transistor Q8 then conducts constant current $I_2$, which is equal to the voltage $V_B$ at the emitter of the transistor Q8, as determined by the bias applied at its base by the transistor Q6, divided by the resistance of the resistor R16. That is, $$I_2 = V_B/R16 \tag{1}$$

where R16 is the resistance of the the resistor R16.

This constant current $I_2$ flows into the capacitor C3, thus charging the capacitor C3 linearly, whereby the point F rises linearly in voltage from its starting point to the voltage at which the transistor Q5 conducts, namely about 0.6 v, as shown by waveforms 8F and 9F. At that point conduction by the transistor Q5 drives the point G to ground as shown by waveforms 8G and 9G.

This, in turn, cuts off the transistor Q4 permitting the point H to rise in voltage as constant current $I_1$ flows through the transistor Q7. This current is equal to the voltage $V_B$ at the emitter of the transistor Q7, as also determined by the bias applied at its base by the transistor Q6, divided by the resistance of the resistor R14. That is, $$I_1 = V_B/R14 \tag{2}$$

where R14 is the resistance of the resistor R14.

This constant current $I_1$ causes a linear rise in the voltage at the point H as shown by waveforms 8H and 9H, until the capacitor is fully charged to the limit determined by the bias voltage, or the next pulse arrives at the point E. For the production of a time delay TD that is a constant fraction of the engine cycle, the point H must not reach the full potential, at least not until the next pulse is applied. Actually, FIG. 8 illustrates the case where the full potential is just reached when the next pulse arrives. This break point is at 300 rpm for the gasoline mode. FIG. 9 illustrates a condition well above the break point at 600 rpm.

The period T of the pulses applied at the point E is 90° irrespective of speed for an 8 cylinder engine. This is 50 ms at 300 rpm and 25 ms at 600 rpm. The time delay TD generated by the timing retard circuit 36 is the time between conduction by the transistor Q3 and conduction by the transistor Q5. During the time TD, the capacitor C3 is charged through the resistor R16 and the transistor Q8 with the transistor Q4 on. During the remainder of the period T, that is that portion (T−TD) of the cycle after the time delay, the capacitor C3 is charged through the resistor R14 and the transistor Q7 with the transistor Q3 and Q4 off. The consequence of the operation of the timing retard circuit 36 is that the voltage $VH_{max}$ reached at the point H is the product of the constant current $I_1$ and the portion (T−TD) of the cycle of period T after the time delay TD divided by the capacitance C3 of the capacitor C3, $$VH_{max} = I_1(T-TD)/C3 \tag{3}$$

The potential change $VF_{ch}$ at the point F is equal to the product of the constant current $I_2$ and the time delay TD divided by the capacitance C3 of the capacitor C3.

$$VF_{ch} = (I_2/C3)TD \tag{4}$$

As $VF_{ch}$ and $VH_{max}$ are equal for the condition where the potential at the point H has not reached its full potential (or, in the case of FIG. 8, just reaches it)

$$(I_2/c3)TD = (I_1/C3)(T-TD) \tag{5}$$

The ratio of the currents is therefore $$I_1/I_2 = TD/(T-TD) \tag{6}$$

That is, the ratio of the current $I_1$ to the current $I_2$ is equal to the ratio of the time delay or retard timing interval TD to the difference between the interval between timing pulses T and such retard timing interval TD. Substituting from equations (1) and (2)

$$TD/T = R16/(R14+R16) \tag{7}$$

That is, the time delay is a constant fraction of the period T irrespective of engine speed above the predetermined break-point speed, 300 rpm in this example. With the resistance values as shown in FIG. 5, namely, with R14 equal to 100 kilohms and R16 equal to 20 kilohms, TD is 15° irrespective of engine speed, so long as the capacitor C3 is not fully charged, that is, so long as the voltage at the point H is not limited by the voltage supplied by the transistor Q6. This creates the 15° time delay shown as the horizontal portion of the curve GASOLINE RETARD shown in FIG. 3, namely, the portion above 300 rpm. For that portion of the curve below 300 rpm, an explanation will be given below in connection with the LPG RETARD curve, as the GASOLINE RETARD curve below 300 rpm is relatively unimportant, being far below idle.

In respect to the LPG RETARD curve, this curve is provided by introducing resistors R15 and R17 into the circuits for charging the capacitor C3. The resistors R15 and R17 are connected in parallel with the resistors R14 and R16, respectively, by means of transistors Q9 and Q10, respectively. In the gasoline mode with the control switch 38 open, the transistors Q9 and Q10 are held off by connecting the junction of the resistors R22 and R23 to ground through a resistor R24 to keep the bases of the transistors Q9 and Q10 at ground potential when the switch 38 is open. Closing the switch 38 connects the +12 v bus to this junction, hence applying +12 v to the bases of the transistors Q9 and Q10 through the resistors R22 and R23, respectively. This effectively places the resistor R15 in parallel with the resistor R14 and the resistor R17 in parallel with the resistor R16, hence reducing the resistances through which currents $I_1$ and $I_2$ flow. As shown, the resistance of the resistor R15 is made 1/9 the resistance of the resistor R14, and the resistance of the resistor R17 is made 1/9 the resistance of the resistor R16. This makes the resistances of the parallel resistors in the LPG mode 1/10 the resistance of the resistors in the gasoline mode. Consequently, by operation of equations comparable to Equations (1) and (2) above, the currents $I_1$ and $I_2$ each increase by a factor of 10. This shortens the time delay TD in units of time, but in accordance with the equation corresponding to Equation (6) above, the time delay TD remains relatively the same fraction of the engine cycle, namely 15°, so long as the threshold limit of speed is exceeded, that is, so long as the capacitor C3 does not become fully charged by the current $I_1$, during the portion of the cycle after the time delay. This threshold is at 3000 rpm in the LPG mode in this example. Thus, with the switch 38 closed, the circuit 36 operates to produce the time delay characteristic shown as the horizontal portion of the LPG RETARD characteristic shown in FIG. 3, namely, at 15° in this example.

As the development of the horizontal portions of the respective GASOLINE RETARD and LPG RETARD curves of FIG. 3 are developed in exactly the same manner, and provide the same 15° retard, the only differences relate to the factors of 10 in the charging rates of the capacitor C3 by the constant currents $I_1$ and $I_2$, which themselves differ in producing the two retard curves by factor of 10. Hence, the waveforms of FIGS. 8 and 9 are identical for the gasoline and LPG modes, i.e., which the switch 38 open or closed, except for the factor of 10 in speed. That is, the waveforms at the points E to J as shown in waveforms 8E to 8J and 9E and 9J at 300 rpm and 600 rpm, respectively, in the gasoline mode with the switch 38 open are the same as the corresponding waveforms at 3000 rpm and 6000 rpm, respectively, in the LPG mode with the switch 38 closed, the only differences being in the time bases as indicated in parentheses in FIGS. 8 and 9.

For developing the characteristic curves shown in FIG. 3 for LPG RETARD below 3000 rpm and for GASOLINE RETARD below 300 rpm, comparison is invited between the waveforms 8E to 8J and the waveforms 10E to 10J shown in FIG. 10, which show the waveforms at the same points E to J, respectively, at 1500 rpm with the switch 38 closed (LPG mode) and at 150 rpm with the switch 38 open (gasoline mode). As stated above, 300 rpm in the gasoline mode (3000 rpm in the LPG mode) is the break point. Above this speed, the retard interval is a constant fraction of the cycle, 15° with the components shown in FIG. 5. Below this speed, the retard interval is a constant time interval, 8.3 milliseconds in the gasoline mode and 0.83 milliseconds in the LPG mode with the components shown in FIG. 5. Not surprisingly, as the engine slows, the capacitor C3 has a longer time to charge to the potential determined by the resistors R11 and R12 and the transistor Q6, after which time the potential at the point H remains fixed at that potential. Hence, when the transistor Q3 is made to conduct by the signal at point E, the potential at the points F and H drop by the potential thus established by the resistors R11 and R12. This being a fixed potential, the time taken to charge the capacitor C3 through the transistor Q8 to place the point F at the potential required to cause the transistor Q5 to conduct is a constant time, irrespective of engine speed. Thus, from Equation (4), $$TD = VF_{ch}(C3/I_2) \tag{8}$$

This constant time is the time delay TD below the break point. Comparison of FIGS. 8 and 10 demonstrate that the fraction that the time delay TD is of the engine cycle thus decreases. This decrease is a linear function of speed. Hence, as the engine speed is reduced, the time delay function of the cycle decreases linearly, producing the part of the LPG RETARD curve shown in FIG. 3 below 3000 rpm with the switch 38 closed. With switch 38 open, the part of the GASOLINE RETARD characteristic shown in FIG. 3 below 300 rpm is developed in this same manner. The time delay TD above the break point is inversely proportional to the constant current $I_2$, as shown by Equation (8).

In summary, with the timing retard circuit 36 illustrated in FIG. 5, a timing signal is produced at the point J with each pulse applied at the point E, with a programmed time differential in accordance with the GASOLINE RETARD and LPG RETARD characteristics shown in FIG. 3. Thus, with the apparatus thus far described, with the switch 38 open, a timing signal indicative of engine position in an engine cycle is generated mechanically by the position of the timing signal generator 22. Programmed timing is introduced by the programmed timing control 24 so that the timing signal occurs at a programmed time relative to some engine position, such as relative to top dead center for a respective cylinder, which time varies with engine speed in accordance with the ORIGINAL GASOLINE ADVANCE curve. A mechanical advance offset is introduced by adjustment of the programmed timing control 24 to introduce a fixed DISTRIBUTOR OFFSET advance to the timing. Then the programmed timing retard circuit 36 introduces a corresponding GASOLINE RETARD to the timing signal, leaving the final pulses at point J with the relative timing advance illustrated by the MODIFIED GASOLINE ADVANCE curve of FIG. 3. This is substantially the same curve as in the ORIGINAL GASOLINE ADVANCE curve originally programmed by the conventional timing signal generator 24, as would be generated as shown in FIG. 1, the deviation below 300 rpm being substantially irrelevant as it is so far below idle.

Upon closure of the control switch 38, the timing retard circuit 36 introduces the incremental retard characteristic as illustrated by the LPG RETARD curve shown in FIG. 3. This additively combines with the mechanical ORIGINAL GASOLINE ADVANCE characteristic introduced by the programmed timing control 24 and the mechanical DISTRIBUTOR OFFSET advance introduced by mechanical adjustment of the programmed timing control 24 to provide the LPG ADVANCE timing characteristic illustrated in FIG. 3.

The timing retard circuit 36 provides the respective curves of FIG. 3 when the components have the component valves shown in FIG. 5. The curves of FIG. 4 for dual gasoline/CNG operation are produced in a comparable manner with the following component values substituted:

R14—180 kilohms
R15—13 kilohms
R16—36 kilohms
R17—1.8 kilohms
C3—0.22 microfarads The delayed timing pulses, as produced by the timing retard circuit 36, are applied at the point J to the variable dwell circuit 40. The signals at the point J, therefore, have the programmed timing advance required for the alternative fuel when the timing control switch 38 is closed and the appropriate programmed timing advance for gasoline when the control switch 38 is open.

The variable dwell circuit 40 includes an input multivibrator 46 which normally operates much like the multivibrator of the timing retard circuit 36, to divide the engine cycle into substantially equal fractions, irrespective of engine speed. More particularly, an input pulse at the point J is applied to the base of a transistor Q12, turning on that transistor, hence grounding a point K, and lowering the potential of a point L by the same amount that the potential at the point K is lowered. This in turn turns off a transistor Q14. A capacitor C5 is then charged from the +5.1 v bus through a resistor R30 until the point L reaches the point of conduction of the transistor Q14. Meanwhile, while transistor Q14 is off, a point M is raised by way of a resistor R32 to the +5.1 v potential of the +5.1 v bus, hence operating by way of a resistor R31 to turn on a transistor Q13 to maintain the point K at ground potential until the transistor Q14 is again turned on at the time the capacitor C5 becomes sufficiently charged. At that time, the point M is grounded by the transistor Q14. This operates through the resistor R31 to turn off the transistor Q13. Thereafter the other side of the capacitor C5, that is, point K, is charged from the +5.1 v bus through a resistor R29 in parallel with the series connection of a resistor R25 and a diode D3. The connection between the resistor R25 and the diode D3 is connected to ground through a resistor R26. The effect of the diode D3 and the resistor R26 is to permit the capacitor C5 to be charged relatively rapidly through the resistor R25 in parallel with the resistor R29 until the point K reaches the potential established by the resistors R25 and R26, connected as a voltage divider, at which time the diode D3 isolates the resistor R25 from the capacitor C5, so that thereafter the charging is entirely through the resistor R29.

At any operating speed, the diode D3 remains conductive, and the multivibrator 46 operates to ground the point K for a substantially constant fraction of the cycle, namely, 10° utilizing components as shown in FIG. 5. On the other hand, at very slow, non-operating speeds, as during starting, the diode D3 is cut off. The purpose of the diode D3 is to provide a compound charging characteristic so that the capacitor C3 is not rapidly charged to the +5.1 v potential of the +5.1 v bus. This prevents the capacitor C5 from becoming fully charged, for if the point K were to reach the +5.1 v potential of the +5.1 v bus, the output switch 42 would be opened at a point other than the desired point in the cycle, as will be discussed further below.

Waveform 11K in FIG. 11 shows the waveform at the point K at very slow speeds. Waveforms 12J, 12K, 12L and 12M in FIG. 12 illustrate the waveforms at the respective points J, K, L and M at 170 rpm, about cranking speed. Waveforms 13J, 13K, 13L and 13M in FIG. 13 illustrate the waveforms at these same respective points at 880 rpm, about idle. Waveforms 14J, 14K, 14L and 14M in FIG. 14 illustrate the waveforms at these same respective points at 3500 rpm, high speed. As shown, a pulse at the point J drives the point K to ground and causes the point M to go high (2 v) for the period of the monostable multivibrator 46. The point M then goes low (ground) for the remander of the cycle, and the potential on the point K rises to reach its original potential at the end of the cycle, such original potential being determined by the duration of the cycle at a respective frequency.

When a pulse at the point J drives the point M high, the high signal at point M is applied through a resistor R46 to turn on a transistor Q21, which grounds a point N. This turns off a Darlington Q23, which is connected to the +12 v bus by a resistor R50 and to ground by way of a diode D8 in parallel with resistors R52 and R48 in series. Just prior to such switching of the transistor Q21, the Darlington Q23 was held in its on condition by means explained further below. The turning off of the Darlington Q23 reduces the voltage across the resistor R52 to zero. This signal is applied to the output transistor switch 42 to interrupt the current through the ignition coil 16. Waveforms 12N, 13N and 14N at the respective speeds of 170 rpm, 880 rpm and 3500 rpm illustrate the waveforms at the point N. The point N is held at ground potential for the duration of the high at the point M, the period of the multivibrator 46, and remains at ground potential thereafter until raised in the manner explained below. The signal at the point N controls the flow of current through the primary of the ignition coil 16, establishing it in the manner explained below and interrupting it upon the occurrence of the high at the point M. This assures the cutoff of current in the primary of the ignition coil for at least this period, nominally about 10°, assuring time for a spark to occur. The high signal at the point M is also applied through a transistor Q20 to drive a point O to ground at the same time for the duration of the high at the point M, the period of the multivibrator 46. Just prior to the switching of the transistor Q20, the point O is held at the +5.1 v potential of the +5.1 v bus through a resistor R42. Waveforms 120, 130 and 140 illustrate the waveforms at the point O at the respective speeds.

At the same time that the point M goes high, the point K goes to ground for the period of the multivibrator 46. The signal at the point K is applied to the base of an emitter-follower transistor Q15 powered through a load resistor R33 from the +5.1 v bus. The output signal at the emitter of the transistor Q15 is applied to the base of a transistor Q16. When the input to the transistor Q16 goes to ground, the transistor Q16 is turned off. Before the transistor Q16 is thus turned off, a capacitor C7 is being charged through a resistor R34 from the +5.1 v bus, developing a potential at a point P at the ungrounded side of the capacitor C7. When the transistor Q16 is turned off, the capacitor C7 is isolated from its power source. Waveforms 12P, 13P and 14P illustrate the waveforms at the point P at the respective speeds. The waveforms are at their respective maxima at the moment the transistor Q16 is turned off.

At the moment that the transistor Q16 is turned off, the point O is driven to ground, as stated above. This lowers the potential of a point Q by the same amount that the potential of the point O was lowered, by virtue of the fact that the points O and Q are coupled by a capacitor C8. When the point Q goes low, the potential at that point operates through a resistor R38 to turn on a transistor Q17, whereby the capacitor C7 discharges partly into the capacitor C8 through the transistor Q17, raising the potential at the point Q until either the point Q reaches a potential that cuts off the transistor Q17 or the transistor Q20 is turned off by a low signal at the point M. The emitter of the transistor Q17 is connected to ground through a resistor R37 and a diode D4. When the transistor Q20 is turned off, the transistor Q17 is off and the capacitor C8 charges from the +5.1 v bus through the resistors R42 and R38 and the resistor R37 in parallel with the diode D4. Waveforms 12Q, 13Q, and 14Q illustrate the waveforms at the point Q at the respective speeds. The respective time constants are such that the potential developed across the capacitor C8, that is, the difference in potentials between the points O and Q, is substantially the same each time just prior to the grounding of the point O substantially irrespective of the period of the multivibrator 46 at moderate speeds. The consequence of this is that the same charge is added to and removed from the capacitor C8 each cycle. As this charge is transferred from the capacitor C7 each cycle, the potential across the capacitor C7 at the point P is reduced by a constant predetermined amount by each withdrawal of charge, irrespective of speed at moderate speeds. At higher speeds, there is not time enough for the capacitor C8 to be fully charged or discharged, as may be seen from the waveform 14Q.

Meanwhile, while the capacitor C7 is isolated from its power source by the turning off of the transistor Q16, it also discharges through a diode D5 and a resistor R44 to ground through the transistor Q20 for so long as the transistor Q20 is turned on and the potential at the point P is greater than the diode drop across the diode D5. This also lowers the potential at the point P. However, the amount this potential is lowered in this fashion depends upon how high the potential is at point P and the period of the multivibrator 46. More charge flows at lower speeds. This is evident by reference to waveforms 120, 130 and 140, where superposed waveforms 120' and 130' indicate the waveforms at a point O' between the resistor R44 and the diode D5. The differences between the waveforms 120 and 120' and between the waveforms 130 and 130' are occasioned by the voltage drop developed across the resistor R44 by the current flowing therethrough. As shown the difference is much greater at the lower speed. At very high speed, such as at 3500 rpm, the characteristic voltage drop of the diode D5 is not overcome by the peak potential at this point P; hence, no current flows. The total charge transferred from the capacitor C7 through the resistor R44 is proportional to the areas between the respective curves. As the period of the multivibrator 46 is longer at lower speeds, the charge transfer is greater at lower speeds both because the current flow is at a greater rate and because the period of current flow is longer.

When the multivibrator 46 reaches the end of its period, the point M goes low, turning off the transistors Q21 and Q20. The point N remains low until the capacitor C12 is charged subsequently by operation of transistors Q18 and Q19. On the other hand, the point O immediately rises by reason of the connection to the +5.1 v bus through the resistor R42 and the charge on the capacitor C8. At the same time the transistor Q17 is turned off because the point Q is, by the same action, raised in potential by the same amount that the point O is raised. After the transistor Q20 has been turned off, the point O rises in potential as the capacitor C8 is charged through the resistor R42 from the +5.1 v bus. At the same time the decreasing current through the resistor R38 occasioned by the charging up of the capacitor C8 reduces the potential at the point Q to the diode voltage drop of the diode D4.

The turning off of the transistor Q16 also operates to turn off the transistor Q18 and thence the transistor Q19, both of which receive power from the +5.1 v bus through a resistor R41. A resistor R40 is connected between the collector of the transistor Q18 and the emitter of the transistor Q19, which is at a point R. The point R is connected to ground through a resistor R39 and to the point N through a resistor R43. The point N is connected to ground through the capacitor C12. The turning off of the transistor Q18 and the consequent turning off of the transistor Q19 develops a signal at the point R that is applied through the resistor R43 to keep the point N low even after the transistor Q21 is subsequently turned off, until a signal is developed to turn the output switch 42 on at a particular time. Waveforms 12R, 13R and 14R illustrate the waveforms at the point R at the respective speeds.

At the end of the period of the multivibrator 46, the potential at the point K rises. This potential is applied through the emitter-follower transistor Q15 to raise the potential of the base of the transistor Q16 in accordance with the signal at the point K. When the potential at the base of the transistor Q16 approaches the potential at the emitter of the transistor Q16, the point P, the transistor Q16 begins to conduct, thereby charging the capacitor C7 through the resistor R34. The potential at the point P rises thereafter with the potential at the point K, building up a charge on the capacitor C7. Comparison of the waveforms at the points K and P illustrates their relationship. The peak potential at the point P is necessarily reached at the moment the potential at the point K goes low, cutting off the transistor Q16. The peak thus identifies the timing signal for interrupting current through the primary of the ignition coil 16 to cause a spark in a respective cylinder. At constant speed, the peak occurs at the same point in each cycle. The point where the transistor Q16 starts to conduct depends upon the level of the potential at the point Q after charge has been removed as well as upon the potential at the point K. At all operating speeds, the potential at the point K rises linearly as a function of time, as is shown by waveforms 13K and 14K. At moderate speeds the charge removed from the capacitor C8 is a constant. Hence, the point of conduction of the transistor Q16 is a substantially constant time interval prior to the switching off of the transistor Q16S at moderate speeds. At high speeds, the amount of charge removed is less, and consequently the point of conduction is not so long before the switching.

When the transistor Q16 conducts to charge the capacitor C7, a potential is developed across the resistor R34 which causes the transistor Q18 to conduct, in turn causing the transistor Q19 to conduct. This develops a high signal at the point R, thereby applying a positive signal to the point N, turning on the Darlington Q23, and hence turning on the output transistor switch 42 to cause current to flow through the primary of the ignition coil 16. The signal at the point N, as illustrated by waveforms 12N, 13N and 14N for the respective speeds, thus determines the timing of the turning off and on of current through the primary of the ignition coil 16.

As a voltage must be developed across the resistor R34 to turn on the transistor Q18, it is essential that the potential at the point K not reach +5.1 v. It is for this reason that the diode D3 decouples the point K from the resistor R25 at high potentials, as described above, to cause the capacitor C5 to charge more slowly and hence cause the potential of the point K to rise more slowly, as shown by waveform 11K. This will assure turning on of the output transistor switch 42 in starting.

The output transistor switch 42 comprises a Darlington Q24 connected at its collectors to the primary of the ignition coil 16. The input from the variable dwell circuit 40 is applied to the Darlington Q24 across the resistor R52. Diodes D9 and D10 are connected in series across a capacitor C11 between the collectors and the input of the Darlington Q24 to prevent overvoltages on the Darlington Q24. The resistor R52 is connected between the input and the output of the Darlington Q24. The input of the Darlington Q24 is applied to the current limiter circuit 44 at a point S.

The current limiter circuit 44 includes a resistor R48 through which the ignition coil current flows for developing a control voltage at the point S indicative of such current. Waveforms 12S, 13S and 14S illustrate the waveforms at the point S at the respective speeds, and hence ignition current flow at the respective speeds.

The voltage at the point S is applied through a resistor R49 to the base of a transistor Q22. A resistor R47 is coupled between the base and emitter of the transistor Q22, and a capacitor C9 is connected between the base and collector of transistor Q22. The function of the transistor Q22 is to control the voltage at the point N so as to limit the current through the resistor R48 to the desired value of current limit in the primary of the ignition coil 16. That is, the resistors R47 and R49 comprise a voltage divider such that when the voltage at the point S indicates the maximum allowable current, the transistor Q22 conducts. The transistor Q22 controls the signal at the point N at such value as to prevent the signal at the point S from rising above the voltage limit signifying the current limit. In this case a suitable current limit is 7.5 amperes. This is higher than is permitted in conventional ignition coils, because the current through the ignition coil is held off by the variable dwell circuit 40 for a longer period of time than in standard ignition systems. This permits a higher current to be present at the time of current interruption because current is not flowing through such a large portion of the cycle and hence is not heating the ignition coil to such an extent, it being the heating of the coil that is generally the limiting factor. Typically, current is limited to 4 amperes in standard ignition coils with standard ignitions.

The variable dwell circuit 40 operates at different times following a spark to turn on the current in the primary of the ignition coil 16 to build up the current in the ignition coil 16 for providing sufficient energy to cause a spark when the current is interrupted. As it is desirable that the current not flow unnecessarily in the ignition coil, as would result in unnecessary heating of the coil and unnecessary power loss, it is desirable that the current not turn on immediately after the spark, but rather only sufficiently before the next spark as to provide appropriate energy in the ignition coil 46 at the time of current interruption. At slower speeds it is desirable to turn on the current for a longer period in advance of the spark than at higher speeds, because at higher speeds there is residual current in the coil after the spark has fired and the current is turned back on. That is, at high speeds there is insufficient time for all of the energy to be dissipated in a spark and some energy remains in the ignition coil 16, hence not requiring the addition of so much energy for the next firing. This is achieved by the variable dwell circuit 40 as illustrated in FIG. 5.

In summary of the operation of the variable dwell circuit 40, current in the primary of the ignition coil 16 is turned on a programmed time before each expected timing signal appearing at the point J. This is based on the reasonable assumption that succeeding cycles of engine operation are almost always of substantially the same duration. It can therefore be assumed that the peak signals reached at the point K, and hence the peak signals reached at the point P, remain substantially the same for successive cycles. A predetermined voltage is subtracted from the peak signal reached at the point P in one cycle to establish a dwell reference signal at the point P for the next cycle. When the magnitude of signal at the point K reaches the magnitude of the dwell reference signal at the point P, the current is reestablished through the primary of the ignition coil 16, and the magnetic field builds up in the ignition coil. In the variable dwell circuit 40 illustrated, the signal at the point K rises linearly with time at all operating speeds. Further, at moderate speeds, the predetermined voltage that is subtracted is substantially a constant. The current is therefore reestablished a substantially constant time interval before the next expected timing pulse. At higher speeds, the charge drawn off is less, and the time interval is therefore shorter, so that not so much time is available for reestablishing the field. However, as the field is not entirely dissipated at high speeds, it is unnecessary to provide so much time to reestablish it. At very low speeds, as in cranking, it is desired to provide more time for reestablishing the field in order to assure that the field be entirely established so that a hot spark can be assured, it being more important to assure adequate sparks in starting a cold engine.

The collectors of the Darlington Q24 are connected to the point L through a resistor R63. The effect of this is to charge the capacitor C5 more rapidly when the ignition coil 16 is turned off for long periods as in the case of a misfire. In the event of misfire, it is desirable to turn the current back on sooner so as not to dissipate the energy wastefully. A misfire will occur when one of the leads to the spark plugs is broken or falls off. In such case the voltage across the capacitor C11 rises rapidly and the diodes D9 and D10 conduct so as to limit the voltage. This would dissipate energy in the ignition coil, not only wasting energy but perhaps impeding subsequent firing, particularly at high speeds where there is a very short time for current to be reestablished, reliance being placed on the fact that in normal operation the energy is not fully dissipated upon each firing. With the feedback to the point L, the higher voltage developed advances the charging of the capacitor C5 to shorten the period of the multivibrator 46, hence hastening the turning back on of the current through the primary of the ignition coil 16 before all the energy is dissipated.

Although a preferred embodiment of the invention has been shown and described with particularity, various changes in the circuit may be made within the scope of the present invention. For example, a voltage divider formed by resistors R35 and R36 may be connected between ground and the +12 v bus, with the junction of two resistors connected to the point P by a diode D7. This operates to assure that the voltage at the point P not rise above the potential at the junction of the resistors R35 and R36. This circuit is effective in cold weather for starting with a low battery. Under low battery conditions the junction of the resistors R35 and R36 is low. When this voltage is below the potential that would otherwise exist at the point P, the charge on the capacitor C7 is leaked off through the resistor R36, having advancing the time for turning on the output switch 42 so as to provide more time for current to build up in the coil 16 when the battery is low. This assures that a larger current be built up in the coil 16 to make certain that a spark will be created when the current is interrupted, even though the battery is low.

As another alternative, the components of the timing retard circuit 36 may permit switching of timing for more than two fuels, as all three of gasoline, LPG and CNG.

What is claimed is:

1. For use in an ignition system for a spark ignited internal combustion engine having a plurality of cylinders, which system includes timing means responsive to engine position for producing a timing signal indicative of engine position in an engine cycle, means responsive to said timing signal for initiating a spark in a respective cylinder of the engine, and programmed timing control means responsive to engine speed for controlling the occurrence of said timing signal relative to engine position in systematic relation to engine speed to provide such spark at a timing angle appropriate for a first fuel at each respective engine speed: a timing control for an alternative fuel comprising means responsive to engine speed for producing a controlled timing angle interval systematically related to engine speed, and means responsive to said controlled timing angle interval and said timing signal for changing the timing angle of such spark by said controlled timing angle interval to provide such spark at a timing angle appropriate for a second fuel at each respective engine speed.

2. A timing control according to claim 1 wherein said means for producing a controlled timing angle interval includes advance means for producing a fixed advance timing angle interval, retard means for producing a retard timing angle interval systematically related to engine speed, and means for combining said advance and retard timing angle intervals to produce said controlled timing angle interval.

3. A timing control according to claim 2 wherein said retard means comprises a one shot multivibrator having a period substantially equal to said retard interval.

4. A timing control according to claim 2 wherein said retard means provides a retard timing angle interval that is a substantially constant fraction of the engine cycle at engine speeds above a predetermined engine speed and is a substantially constant time interval at engine speeds below said predetermined engine speed.

5. A timing control according to claim 2 wherein said retard means includes sources of first and second constant currents, and means responsive to said first and second constant currents for producing a retard timing angle interval that bears such ratio to the difference between the timing angle interval between timing signals and said retard timing angle interval as the magnitude of said first constant current bears to the magnitude of said second constant current at engine speeds above a predetermined engine speed and is a substantially constant time interval inversely proportional to the magnitude of said second constant current at engine speeds below said predetermined engine speed.

6. A timing control according to claim 5 including switch means for selectively switching the magnitude of at least one of said constant currents to change the systematic relationship between said controlled timing angle interval and engine speed to provide such spark at a time appropriate for a fuel other than said second fuel at each respective engine speed.

* * * * *

UNITED STATES PATENT AND TRADEMARK OFFICE
CERTIFICATE OF CORRECTION

PATENT NO.  :  4,408,583
DATED       :  October 11, 1983
INVENTOR(S) :  James W. Merrick It is certified that error appears in the above-identified patent and that said Letters Patent is hereby corrected as shown below:

Abstract page, Item [73], change "Automatic Controls, Corp." to --Autotronic Controls, Corp.--.

Column 3, line 45, after "are" insert --an--.

Column 6, line 33, change "curves" to --curve--.

Column 12, line 53, change "function" to --fraction--.

Column 17, line 51, change "input" to --output--.

Column 19, line 41, change "having" to --hence--.

Signed and Sealed this

Twenty-fourth Day of January 1984

[SEAL]

Attest:

GERALD J. MOSSINGHOFF

Attesting Officer     Commissioner of Patents and Trademarks